United States Patent

Obermark

[15] 3,675,747

[45] July 11, 1972

[54] TWO SPEED MAGNETIC CLUTCH DRIVE

[72] Inventor: John A. Obermark, Beloit, Wis.

[73] Assignee: Warner Electric Brake & Clutch Company, South Beloit, Wis.

[22] Filed: Nov. 9, 1970

[21] Appl. No.: 87,840

[52] U.S. Cl. ............... 192/48.2, 192/48.91, 192/84 AA, 192/89 B, 192/103 A
[51] Int. Cl. ............ F16d 27/06, F16d 27/12, F16d 21/02
[58] Field of Search ............... 192/48.2, 48.91, 53 F, 12 D, 192/18 B, 84 A, 84 AA, 84 AB, 87.17, 89 B, 103 A

[56] References Cited

UNITED STATES PATENTS

| | | | |
|---|---|---|---|
| 854,107 | 5/1907 | Pick | 192/84 AA |
| 1,276,379 | 8/1918 | Lindquist | 192/48.91 X |
| 1,901,712 | 3/1933 | Christman | 192/53 F |
| 2,868,341 | 1/1959 | Snoy | 192/87.17 |
| 3,199,648 | 8/1965 | Schwab | 192/87.17 |
| 721,678 | 3/1903 | Douglas | 192/84 AA |
| 3,429,192 | 2/1969 | Allen | 192/84 AA X |

Primary Examiner—Allan D. Hermann
Attorney—Wolfe, Hubbard, Leydig, Voit & Osann

[57] ABSTRACT

In the two speed magnetic clutch drive illustrated, two magnets having oppositely facing pole ends are rigid with each other and axially shiftable selectively into gripping engagement with one or the other of axially fixed disk armatures driven at different speeds. The magnet unit is supported from a driven shaft through angularly spaced and tangentially extending leaf springs which provide a frictionless mounting for the magnet unit and, as an incident to engagement of either clutch, are stressed to provide the force for separating the magnet unit from the armature disk when the clutch magnet is deenergized.

4 Claims, 6 Drawing Figures

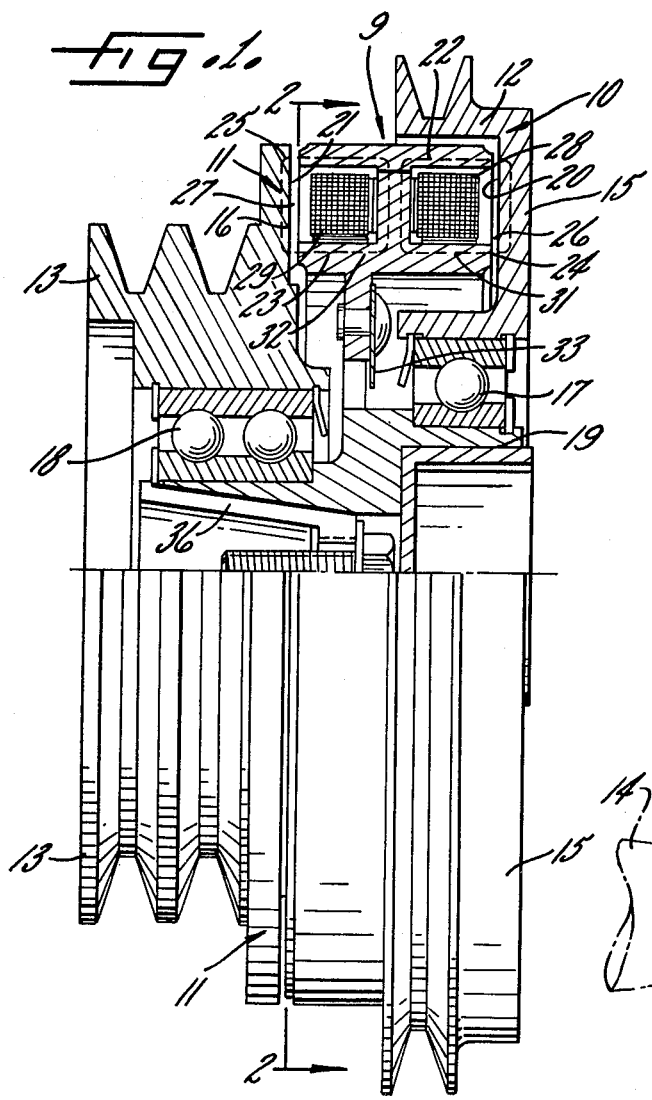
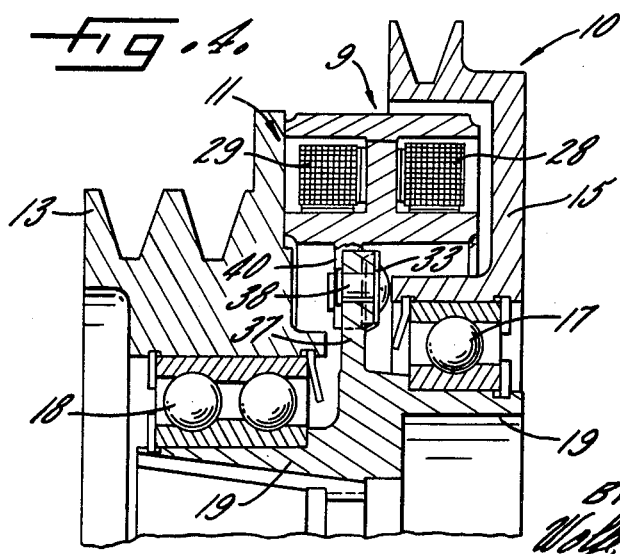
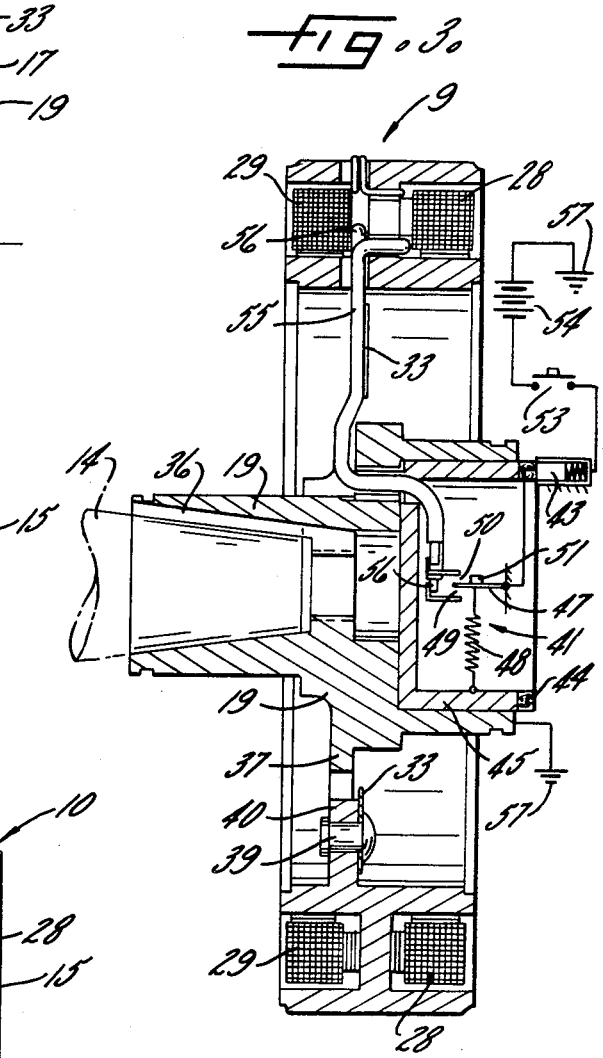

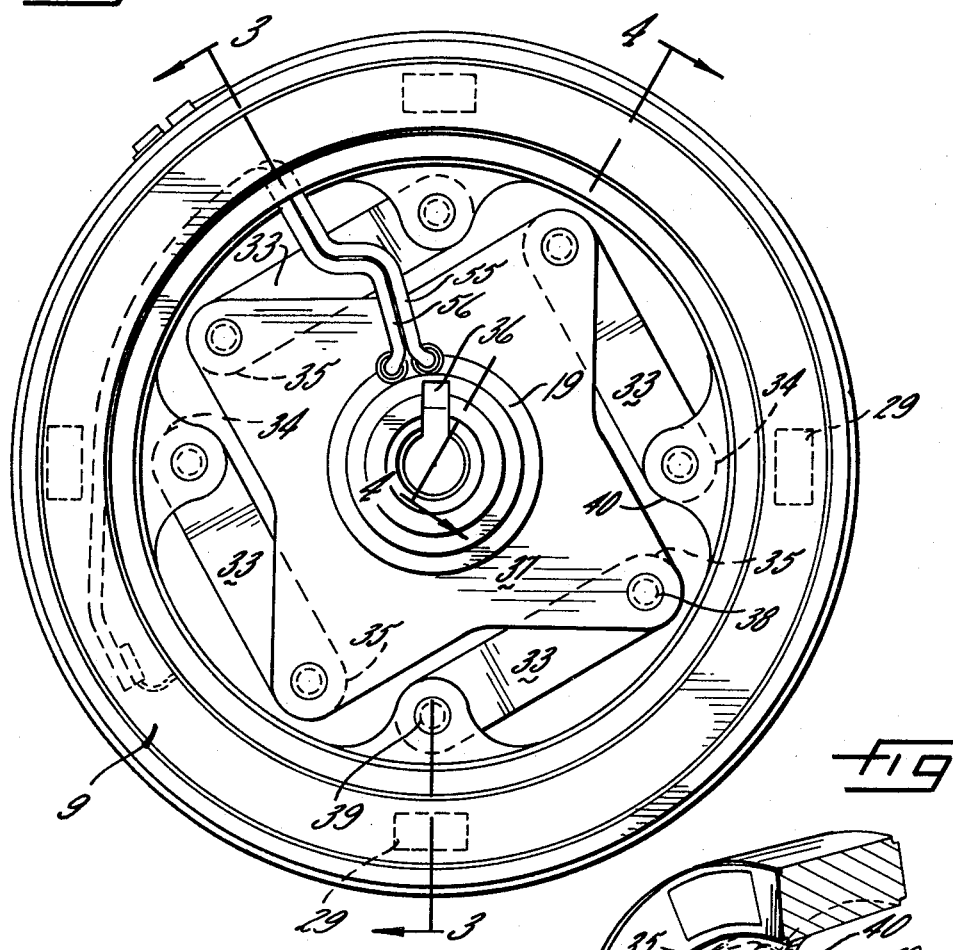
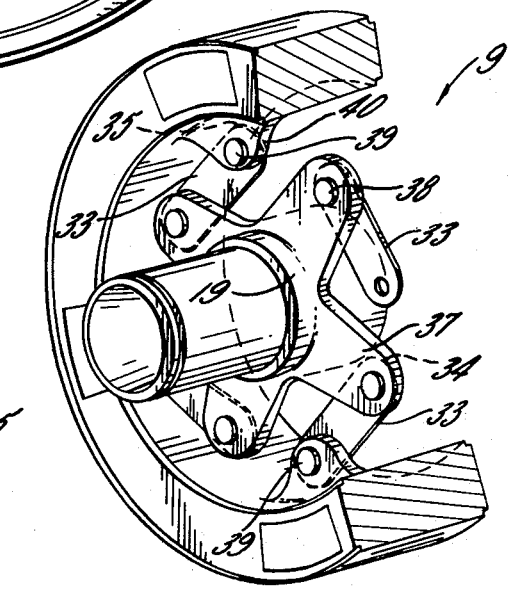
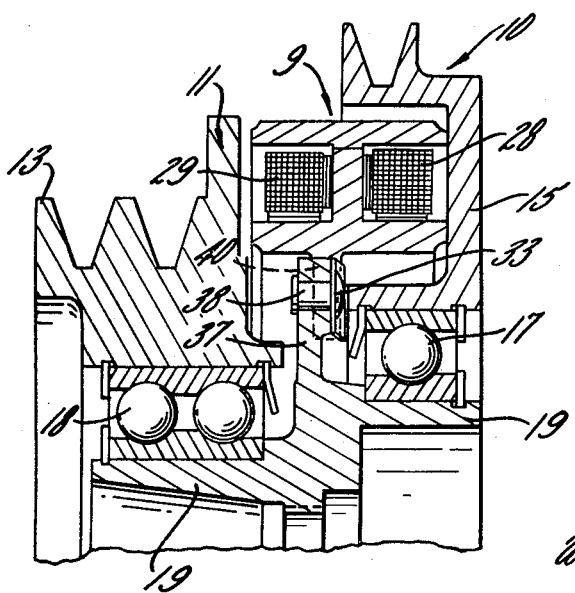
INVENTOR.
JOHN A. OBERMARK

TWO SPEED MAGNETIC CLUTCH DRIVE

BACKGROUND OF THE INVENTION

This invention relates to duplex magnetic friction couplings such as a clutch and brake or a two speed clutch drive, each coupling having two windings energizable selectively to control the engagement of the clutches in the two speed combination or of the clutch and brake windings in the clutch-brake combination. Two speed clutch drives of this character are especially adapted for driving the air conditioning compressor on an automotive vehicle, drives for this purpose being disclosed in U.S. Patents to Gamundi Nos. 2,784,562 (62-4) and Jacobs 2,825,233 (74-336.5).

SUMMARY OF THE INVENTION

The primary objective of the present invention is to provide a duplex magnetic friction coupling of the above character in which two magnet rings of U-shaped cross-section rigid with each other and having oppositely facing pole ends are rigid with each other and mounted for axial shifting to bring the end face of one magnet into gripping engagement with one axially fixed armature ring when the winding of such magnet is energized while the oppositely facing pole ends of the other magnet, when the latter is energized, are drawn into gripping engagement with the opposed armature ring.

A more specific objective is to mount the two magnet units for axial movement and free of rubbing friction through the medium of a plurality of angularly spaced and tangentially extending leaf springs which are unstressed when both magnets are deenergized but which are bent laterally in opposite directions in response to energization of one or the other magnet to engage the corresponding coupling. In each of such opposite bendings, the leaf springs are correspondingly stressed to develop a force of sufficient magnitude to retract the magnet unit to a normal centered position when the magnet of the engaged coupling is deenergized.

BRIEF DESCRIPTION OF THE DRAWINGS

FIG. 1 is a half diametrical section of a two speed clutch drive embodying the novel features of the present invention, both of the magnetic clutches being disengaged.

FIG. 2 is a section taken along the line 2—2 of FIG. 1.

FIGS. 3 and 4 are fragmentary sections taken along the lines 3—3 and 4—4 of FIG. 2, one of the clutches being engaged in FIG. 4.

FIG. 5 is a section similar to FIG. 4 with the other clutch engaged.

FIG. 6 is a fragmentary perspective view partially in section showing the frictionless leaf spring mounting of the double magnet unit.

DESCRIPTION OF THE PREFERRED EMBODIMENT

The present invention is especially advantageous for use in driving the compressor of an automotive air conditioning system at high and low speeds and, for this purpose, is shown in the drawings incorporated in two magnetic friction clutches 10 and 11 having driving elements 12 and 13 driven at high and low speeds, the clutches being adapted for selective axial gripping engagement of their opposed faces to couple a common drive shaft such as the crankshaft of an automotive vehicle to a shaft 14 for driving an air conditioning compressor.

The driving elements of the two clutches comprise pulleys of different diameters for receiving V-belts driven from the pulleys on the engine crank shaft. The pulley grooves are formed on the outer peripheries of the driving elements which take the form of disks 15 and 16 journaled through bearings 17 and 18 axially spaced along and having race rings secured between opposed spaced shoulders to a hub 19 on the driven shaft. The bearings may be of the thrust type so as to hold the driving disks 12 and 13 axially fixed with their opposed surfaces 20 and 21 parallel to each other. These surfaces and the adjacent portions of the disks constitute the armatures of the two clutches 10 and 11.

Disposed between these armatures and coacting therewith to form the two clutches is a magnet unit 9 comprising two magnetic cores 22 and 23 of U-shaped cross-section rigid with each other in back to back relation and having concentric pole pieces with end faces 24 and 25. In the centered position of the unit shown in FIG. 1, the pole faces are separated from the armature faces by air gaps 26 and 27. Between the pole pieces of the respective clutches are multiple turn annular windings 28 and 29 selectively energizable to produce flux threading one of the toroidal paths 31 and 32 through the surrounding magnet core and opposed armature disk.

In accordance with the present invention, the two armature disks are fixed axially by virtue of their mounting on the bearings 17 and 18 and the two-magnet unit 9 is mounted for axial movement away from the centered position shown in FIG. 1 to bring the pole ends 24 and 25 into axial gripping engagement with the armature surfaces 20 or 21 depending on which of the windings 28 and 29 is energized. Each magnet is designed to produce flux of sufficient density in the path 31 or 32 to overcome the gap 26 or 27 and draw the magnet into full gripping engagement with the opposed armature. The gaps are about 0.038 of an inch wide when both magnets are deenergized.

While the desired axial movement of the magnet unit 9 in opposite directions toward and away from the centered position may be achieved in various ways, the present invention contemplates a mounting which is not only free of rubbing friction but also supplies both of the oppositely directed forces for returning the magnet unit back to centered position when both magnets are deenergized. To these ends, the support for the magnet unit comprises the driven hub 19 and a plurality of leaf springs 33 (FIGS. 2 and 6) angularly spaced around the clutch axis, extending along secants of the magnet unit, and fixed at opposite ends 34 and 35 to the hub and the magnet unit respectively.

The hub is shaped to fit and be secured as by a key 36 to a tapered end on the shaft 14 and is formed with angularly spaced radial projections 37 apertured to receive rivets 38 by which the ends 34 of the leaf springs are secured to the hub. The other ends 35 of the leaf springs are secured by rivets 39 to radial flanges 40 projecting inwardly from the inner pole pieces of the magnet unit 9. The flanges 40 and the projections 37 are disposed approximately in the center plane of the magnet unit, the arrangement being such that when both of the magnet windings 28, 29 are deenergized, the spring leafs are substantially unstressed. But when one winding, for example 29, is energized and the magnet unit drawn into gripping engagement with the armature 16 as shown in FIG. 4, all four of the supporting leaf springs are bent laterally and to the left and thus become stressed in a direction to develop a force biasing the magnet unit to the right and toward the centered position. With a movement equal to the width of the gap 27 closed by engagement of the clutch, it has been found that the biasing force developed in the leaf springs will be of sufficient magnitude to return the magnet unit to the centered position when the active magnet winding 29 is deenergized.

Similarly, when the winding 28 is energized, the magnet unit is attracted against the armature 15 to overcome the gap 27 and engage the clutch 19 as shown in FIG. 5 thus bending the springs 33 to the right and stressing the same sufficiently and in a direction to effect the return of the magnet unit to the centered position when the windings 28 are deenergized.

It will be apparent that the leaf springs 33 not only provide an extremely simple, inexpensive and frictionless mounting for the double magnet unit 9 but also develop the oppositely directed return forces which become effective automatically as incidents to deenergization of the respective clutches to overcome any residual magnetism persisting in the active flux circuit and effectually return the magnet unit to its centered position. The leaf spring mounting also contributes greatly to the overall axial compactness and structural simplicity of the two clutches.

The two speed clutch arrangement above described is especially adapted for driving the compressor of an automotive air conditioning system under the control of a conventional switch assembly 41 responsive to changes in the speed of the driven hub 19. For this use and as illustrated schematically in FIG. 3, current from a source 54 may be conducted to the respective windings 28 and 29 through insulated conductors 55 and 56 and through a stationary brush 43 continuously pressed against a commutator ring 44 on the end of a cup 45 in which the switch assembly is housed and which is secured to the driven hub 19 so as to rotate therewith. The brush may be connected to the voltage source by closure of a control switch 53, the other terminals of the voltage source and the clutch windings 28, 29 being grounded at 57.

As shown schematically in FIG. 3, the switch assembly comprises a tongue 47 fixed at one end to the cup 45 and cooperating with a terminal to form a switch 49 which is closed with a snap action when the force of a spring 48 overcomes the centrifugal force of a flyweight 51 on the tongue. When the hub speed increases above a predetermined value, the centrifugal force overcomes the spring bias and the tongue snaps over-center to open the switch 49 and close the switch 50 thus deenergizing the high ratio winding 29 and energizing the winding 28 of the low ratio clutch 10.

I claim:

1. A double magnetic friction coupling having, in combination, armature disks axially fixed and spaced apart along a common axis, means supporting at least one of said disks for rotation about said axis, an axially fixed hub rotatable about said axis, a magnet unit surrounding and concentric with said hub and comprising two back-to-back magnets of U-shaped cross-section rigid with each other and having concentric pole pieces with ends facing axially in opposite directions and separated from the opposed armature disks by narrow air gaps when the magnets are in a centered position, each of said magnets having a multiple turn winding disposed between the pole pieces thereof cooperating with the opposed armature to define a toroidal path for flux causing attraction of the magnet to and gripping engagement with such disk when the winding of the magnet is energized, and generally flat spring means joining said hub and said magnet unit and providing therebetween a torque transmitting connection which is free of rubbing friction and supports said magnet unit for free axial floating relative to said hub from said centered position in opposite directions into engagement with said armature disks under the attractive force of the respective magnets, said spring means being substantially unstressed when free with the magnet unit in said centered position but oppositely stressed in the attraction of said unit to and against the respective armature disks whereby to develop in each instance an axially directed force for returning said unit to said centered position when the magnet producing the attraction is deenergized.

2. The combination as defined in claim 1 in which said spring means comprises a plurality of generally flat leaf springs angularly spaced around the axis and fixed at opposite ends to said hub and magnet unit respectively, said leaf springs being unstressed when the magnet unit is centered but bending laterally in opposite directions upon energization of the respective magnet windings and engagement of the pole ends with the respective armatures, such differential stressing of the spring leafs being sufficient to return the magnet unit to said centered position when both magnets are again deenergized.

3. The combination as defined in claim 2 in which one end of each of said leaf springs is fixed to a flange rigid with and projecting inwardly from said magnet unit and the opposite ends are fixed to an outwardly projecting flange on said hub.

4. The combination as defined in claim 1 in which said armature disks cooperate with the opposed faces of said magnets to form friction clutches and are journaled on and axially fixed relative to a common driven shaft and including means for driving the respective armature discs at different speeds.

* * * * *